(12) United States Patent
Bönning et al.

(10) Patent No.: US 8,739,930 B2
(45) Date of Patent: Jun. 3, 2014

(54) GEARBOX COMPRISING GEAR PUMP

(75) Inventors: Jörg Bönning, Darmstadt (DE); Jan Sporleder, Kaiserslautern (DE)

(73) Assignee: GM Global Technology Operations LLC, Detroit, MI (US)

( * ) Notice: Subject to any disclaimer, the term of this patent is extended or adjusted under 35 U.S.C. 154(b) by 1337 days.

(21) Appl. No.: 12/193,586

(22) Filed: Aug. 18, 2008

(65) Prior Publication Data

US 2009/0057061 A1 Mar. 5, 2009

(30) Foreign Application Priority Data

Aug. 31, 2007 (DE) .................... 10 2007 041 318

(51) Int. Cl.
*F16H 57/04* (2010.01)
(52) U.S. Cl.
USPC .......................................... 184/6.12
(58) Field of Classification Search
USPC ........................................ 474/6.12; 184/6.12
See application file for complete search history.

(56) References Cited

U.S. PATENT DOCUMENTS

| | | | | |
|---|---|---|---|---|
| 981,251 A * | 1/1911 | Eames | ................ | 184/6 |
| 1,113,204 A * | 10/1914 | Davis | .............. | 184/6.5 |
| 1,132,947 A * | 3/1915 | Kerr | ................ | 184/109 |
| 1,151,271 A * | 8/1915 | Johansson | ............ | 184/6.12 |
| 1,220,810 A * | 3/1917 | Alquist | .......... | 184/6.12 |
| 1,357,301 A * | 11/1920 | Reaugh | ............ | 184/11.1 |
| 1,429,466 A * | 9/1922 | Turnbull | ............ | 184/6.12 |
| 1,717,814 A * | 6/1929 | Strong et al. | ........... | 184/6.12 |
| 1,820,201 A * | 8/1931 | Simmons | ............ | 184/11.1 |
| 1,912,422 A * | 6/1933 | Andersson | ............ | 184/109 |
| 1,970,385 A | 8/1934 | Maybach | | |
| 2,088,782 A * | 8/1937 | Ford et al. | .......... | 475/145 |
| 2,211,363 A * | 8/1940 | Brenkert | .......... | 184/6.12 |
| 2,214,485 A * | 9/1940 | Short | ............ | 184/6.12 |
| 2,645,305 A | 7/1953 | Roos | | |
| 2,778,238 A * | 1/1957 | Emrick | ............ | 74/377 |
| 2,926,755 A * | 3/1960 | Kolbe | .......... | 184/6.12 |
| 2,984,159 A * | 5/1961 | Schurger et al. | .......... | 409/218 |
| 3,006,439 A * | 10/1961 | Molinaro | ............ | 184/6.12 |
| 3,286,643 A | 11/1966 | Andrews et al. | | |
| 3,529,698 A * | 9/1970 | Nelson | .......... | 184/6.12 |
| 3,576,379 A * | 4/1971 | Parise | .......... | 417/410.4 |
| 3,601,515 A * | 8/1971 | Pelizzoni | ............ | 418/206.4 |
| 3,738,452 A * | 6/1973 | Hausinger | .......... | 184/6.12 |
| 3,990,539 A * | 11/1976 | Marit | .......... | 184/6.12 |

(Continued)

FOREIGN PATENT DOCUMENTS

DE 107518 A1 8/1974
DE 3600871 A1 7/1987

(Continued)

*Primary Examiner* — William A Rivera
*Assistant Examiner* — Henry Liu
(74) *Attorney, Agent, or Firm* — Ingrassia Fisher & Lorenz, P.C.

(57) ABSTRACT

A gearbox for a motor vehicle is provided that includes, but is not limited to an input shaft, an output shaft and a plurality of wheel sets for coupling input and output shaft with different transmission ratios and a gear pump, which is arranged to for delivering from a reservoir of the gearbox. The gear pump is an outer gear pump and one of two gears of the gear pump meshing with one another belongs to one of the wheel sets.

14 Claims, 1 Drawing Sheet

(56) References Cited

U.S. PATENT DOCUMENTS

| | | | | |
|---|---|---|---|---|
| 4,132,514 A | * | 1/1979 | Eckerle | 418/71 |
| 4,184,808 A | * | 1/1980 | Cobb | 417/348 |
| 4,263,815 A | * | 4/1981 | Ashauer | 74/339 |
| 4,329,887 A | * | 5/1982 | Kawamoto | 74/467 |
| 4,355,542 A | * | 10/1982 | Tsutsumi et al. | 74/467 |
| 4,410,060 A | * | 10/1983 | Cunard | 180/206.4 |
| 4,414,861 A | * | 11/1983 | Witt | 74/606 A |
| 4,630,711 A | * | 12/1986 | Levrai et al. | 184/6.12 |
| 4,693,133 A | * | 9/1987 | Tomita et al. | 74/467 |
| 4,721,184 A | * | 1/1988 | Sowards | 184/6.12 |
| 4,745,816 A | | 5/1988 | Horiuchi et al. | |
| 4,909,714 A | * | 3/1990 | Cheng | 418/73 |
| 5,163,824 A | * | 11/1992 | Kantner | 418/153 |
| 5,341,900 A | * | 8/1994 | Hikes | 184/6.12 |
| 5,404,964 A | * | 4/1995 | Zinsmeyer et al. | 184/6.12 |
| 5,522,476 A | * | 6/1996 | Holman | 184/6.12 |
| 5,749,267 A | * | 5/1998 | Kock | 74/467 |
| 5,799,540 A | | 9/1998 | Diehl et al. | |
| 6,109,393 A | * | 8/2000 | Toyota et al. | 184/6.12 |
| 6,142,757 A | * | 11/2000 | Borchert | 418/191 |
| 6,616,432 B2 | * | 9/2003 | Szczepanski et al. | 418/126 |
| 6,634,459 B1 | * | 10/2003 | Litkenhus et al. | 184/6.12 |
| 2004/0206198 A1 | | 10/2004 | Coxon et al. | |
| 2006/0065487 A1 | * | 3/2006 | Tominaga et al. | 184/6.12 |

FOREIGN PATENT DOCUMENTS

| | | |
|---|---|---|
| DE | 8714166 U1 | 1/1988 |
| DE | 19602041 A1 | 7/1997 |
| DE | 19950423 A1 | 4/2001 |
| DE | 10223927 A1 | 7/2003 |
| EP | 1406031 A2 | 4/2004 |
| EP | 1491797 A1 | 12/2004 |
| GB | 458379 A | 12/1936 |
| GB | 1060049 A | 2/1967 |
| GB | 2391596 A | 2/2004 |
| KR | 20050021844 A | 3/2005 |

* cited by examiner

GEARBOX COMPRISING GEAR PUMP

CROSS-REFERENCE TO RELATED APPLICATION

This application claims priority to German Patent Application No. 102007041318.3, filed Aug. 31, 2007, which is incorporated herein by reference in its entirety.

TECHNICAL FIELD

The technical field generally relates to a gearbox, and more particularly to a gearbox for a motor vehicle that includes, but is not limited to a gear pump for delivering a lubricant.

BACKGROUND

Contrary to automatic gearboxes, manual gearboxes typically use passive strategies for distributing lubricant within the transmission system, so as to sufficiently supply all of the components of the transmission system with oil for lubricating and cooling purposes, respectively. The distribution of the lubricant substantially takes place hereby by means of gears of the transmission system dipping into a sump. The gears carry along the lubricant from the sump due to their movement and centrifuge it off due to their rotation and thus convey it within the transmission system.

However, this cannot ensure a specific and even supply of the components under all conditions, because the rotation-related centrifuging is subject to some influencing factors. For example, in situations in which the lubricant is still cold and thus viscous, the distribution of the lubricant to all of the components does not take place fast enough. Furthermore, a relatively high lubricant level must always be ensured so as to ensure that the gears dip into the sump to a sufficient degree. Furthermore, a part of the gears of the transmission systems rotate in reverse direction when the motor vehicle drives backwards so that the lubricant, which is carried along on these gears, is centrifuged off into a different direction than when the motor vehicle drives forward, which can lead to an insufficient lubrication of parts of the transmission system. To be able to actively and specifically convey lubricant to all of the components, an oil pump must thus be used, which requires the use of an additional component and also a constructive adaptation in the gearbox and which thus leads to increased costs.

A gearbox comprising a gar pump, which is embodied as an internal gear pump, is known from EP 1 491 797. An internal gear of the pump is driven by a connection to one of a plurality of gearbox shafts of the gearbox. The gear pump is enclosed by a pump housing and is arranged adjacent to the driving gearbox shaft. So as not to have to adapt the housing of the gearbox, provision is made on the housing of the transmission system for a recess, which is to be closed by means of a cover, wherein the gear pump is fastened on an inner side of a removable cover on the housing of the transmission system and the cover is adapted to the shape of the gear pump. However, in this solution, the cover must be fixedly connected to and sealed with the housing of the transmission system, which is associated with effort and also with risks with reference to a possible leak.

It is thus at least one object to create a gearbox that includes, but is not limited to a gear pump for conveying lubricant, wherein the gear pump can be accommodated in a space-saving manner and does not cause an increased leakage risk. In addition, other objects, desirable features, and characteristics will become apparent from the subsequent summary and detailed description and the appended claims, taken in conjunction with the accompanying drawings and this background.

SUMMARY

The at least one object, other objects, desirable features and characteristics, are solved in that the gear pump is an outer gear pump and one of two gears of the gear pump, which mesh with one another, belong to one of the wheel sets in a gearbox for a motor vehicle that includes, but is not limited to at least one input shaft, one output shaft and a plurality of wheel sets for coupling input and output shaft with different transmission ratios and a gear pump for delivering lubricant from a reservoir of the gearbox. When using only one additional gear, an outer gear pump can thus be formed in a simple manner in combination with a gear of the wheel set. Due to the fact that the gear of the wheel set simultaneously drives the gear pump, no further coupling to the driving gearbox shaft is required. In so doing, only a few components are required for the gear pump, which keeps the costs as well as the space requirement thereof low.

Advantages in view of a flexible construction exist in particular when the gear, which is common to the wheel set and the gear pump, is assembled on the input shaft or on the output shaft. The gear pump can thus be coupled to the gear, which offers the best conditions with reference to the space-saving accommodation of the gear pump on the one hand and with reference to the best mode of operation of the gear pump on the other hand, as a function of the constructive situations within the gearbox.

To be able to switch between different transmission stages, a coupling, for the most part in the form of a blocking synchronization device, is typically assigned to each wheel set. In case of a wheel set, which encompasses the common gear, this clutch is preferably arranged between the common gear and the output shaft and the common gear is permanently connected to the input shaft in a non-positive manner so as to ensure that the gear pump operates continuously when the transmission system is in operation. The common gear can thereby be arranged on the input shaft or also on any other shaft of the transmission system.

The permanent non-positive connection of the common gear to the input shaft furthermore ensures in a simple manner that the pump always runs in the correct delivery direction and displays a sufficient lubricating effect in the forward as well as in the reverse gear. Furthermore, in a situation after the standstill of the vehicle, the gear pump can very rapidly reach a good pumping effect and can thus support the passive lubrication of the gearbox.

A further advantage of this permanent connection is that the gear pump continuously attenuates the rotation of the input shaft. Knocking and rattling noises, which can be created in particular in idling speed of the transmission system by means of an uneven rotation of the input shaft, are thus reduced considerably. The attenuation by means of the gear pump furthermore has the effect that the input shaft comes to a rapid standstill in idling speed. A knocking noise, which often typically occurs in response to a closing of the clutch between engine and transmission system, is thus suppressed in response to a shifting between forward and reverse gear.

With reference to the flow rate and the operational reliability of the gear pump, it is furthermore advantageous when the common gear has the greatest diameter among a plurality of gears, which are assembled on the same shaft. The common gear can thus dip into the sump to the greatest extent and can absorb a sufficient amount of oil even in response to a low oil level and can convey oil into the gear pump. Furthermore, the common gear has the greatest peripheral speed among all of the gears of the shaft and thus causes the highest possible engine speed of the gear pump.

To minimize the driving power required for the operation of the gear pump, it is advantageous if the common gear is the smallest among a plurality of gears assembled on the same shaft, which dip into the reservoir when it includes a prescribed amount of oil. The gear pump substantially operates only during a start-up phase of the transmission system, until an amount of oil, which is so large that the common gear no longer dips into the reservoir, is removed from the reservoir and is distributed in the transmission system.

It is advantageous for the constructive arrangement within the gearbox when the gear pump encompasses a housing, which encloses the common gear only on a part of its periphery. It is not necessary for the mode of operation of the gear pump according to an embodiment to enclose both gears collectively with a housing. Material for the housing and installation space for the gear pump can thus simultaneously be reduced within the transmission system.

It is particularly advantageous hereby when the part of the periphery, on which the common gear is enclosed by the housing, is less than half of the periphery of the common gear. The housing of the gear pump can thus very easily be placed on the common gear from one side, which considerably simplifies the assembly of the gear as well as a potential later maintenance.

Further advantages with reference to the size of the housing result when a deepest location of the periphery of the common gear is not enclosed by the housing. The common gear dips into the sump in a lower region and thus at the deepest location of its periphery and conveys the oil from there in the gaps of its teeth into the housing, where the oil accumulates in front of a meshing region of the two gears. The housing must thus cover the space in front of the meshing region, but not the region of the common gear, from which said gear conveys the oil out of the sump in a still pressure-free manner. The dimensions of the housing can thus be kept small.

With reference to the arrangement of the housing on the common gear, it is particularly advantageous when the housing is movable in the direction of the axle of the common gear. When the common gear is arranged on the shaft, which carries the common gear so as to maintain axial play, the pump housing can accurately follow axial movements of the gear. The axial expansion of the pump housing thus does not need to consider the axial play, but can accurately correspond to the axial expansion of the common gear, which is important for a good degree of efficiency of the pump.

Further advantages of a constructive type result when the second gear is positioned in the housing so as to be afloat. Due to the specific arrangement in the surrounding housing of the gear pump, the second gear does not require a fixed axle so as to be able to be maintained in its position. Due to the fact that the gear is completely surrounded by lubricant, it can easily rotate in the housing, wherein the teeth glide along an inner wall of the housing on a thin film of oil.

Furthermore, it is particularly advantageous when the housing of the gear pump and/or the second gear is made of a plastic material. The housing can thus obtain a required flexibility with reference to a positive fit arrangement on the common gear. At the same time, a friction of the two gears against one another can be reduced, so that in particular the common gear is not subject to an increased wear.

A good fixation within the gearbox can be obtained when the housing is held on an actuating shaft of the gearbox. The actuating shaft can fix the housing in its arrangement as compared to the common gear without requiring additional constructive means for the fixation within the transmission system housing. Due to a parallel arrangement of the actuating shaft as compared to the gearbox shafts, the axial movability of the housing can thus furthermore be made possible at the same time.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
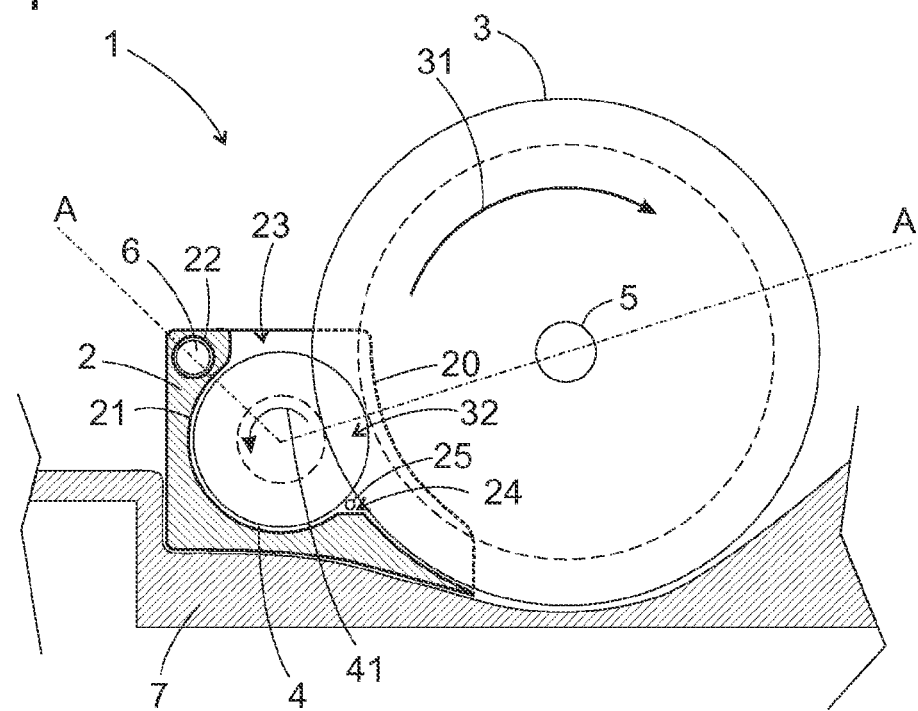
FIG. 1 shows a schematic partial sectional view through a gearbox having a gear pump according to an embodiment.

FIG. 1 shows a section from a gearbox of a motor vehicle, in particular a schematic partial section though the gearbox comprising an outer gear pump according to the invention. The gearbox comprises an input shaft and an output shaft and a plurality of wheel sets of gears, which couple input shaft and output shaft with different transmission ratios and which are arranged within a transmission system housing 7. The gearbox furthermore comprises a gear pump 1, which is also enclosed by the transmission system housing 7.

The gear pump 1 is embodied as an outer gear pump and has a housing 2, a first gear 3 and a second gear 4, and the housing 2 and the second gear 4 are preferably made of a plastic material.

The first gear 3 is formed by a gear wheel of a wheel set of the gearbox so that the wheel set and the gear pump 1 have a common gear 3. This gear 3 is arranged so as to be stationary on a gearbox shaft 5, is driven by it, and rotates in a direction of rotation 31 around the axle of the gearbox shaft 5. The gearbox shaft 5 can in particular be the input or the output shaft of the transmission system; preferably, it is the input shaft, because it typically rotates in the same direction, while the direction of rotation of the output shaft is typically variable, depending on whether a forward or a reverse gear is engaged in the transmission system.

According to a non-illustrated modification, the gearbox shaft 5 supporting the first gear 3 is the output shaft of the transmission system. In this case, the first gear 3 together with a further gear, which is stationary on the input shaft of the transmission system, advantageously belongs to the same wheel set and the further gear is stationary on the input shaft, while the common gear can be decoupled from the output shaft, by which it is supported, by means of a blocking synchronization device. In so doing, it can also be insured that the first gear moves along with the input shaft in a same direction, independent on the currently engaged gear.

Among all of the gear wheels arranged on the gearbox shaft 5, the gear wheel 3 has the greatest diameter. The second gear 4 has a considerably smaller diameter than the gear wheel 3. The gear wheel 3 is fastened to the gearbox shaft 5 so as to maintain play with reference to small movements in axial direction. The gear wheel 3 meshes with the second gear 4 in a region 32.

The housing 2 has a prismatic basic body, which encloses the second gear 4. The housing 2 is open on a side facing the gear wheel 3 and on a region of an upper side adjacent thereto, wherein the gear wheel 3 engages with play between two shoulders 20, which close the housing 2 on both sides. The play is considerably less than the axial play of the gear wheel 3 at the gearbox shaft 5. At a lower part in the direction of a lowest location of the gear wheel 3, the housing 2 is extended and spills into a chamfer, which encloses the gear wheel 3 on a part of its periphery, wherein the lowest location of the gear wheel is not covered by the housing 2.

The lateral shoulders 20 cover the gear wheel 3 on both sides on a part of its periphery, and the cover extends in the direction of the axle of the gear wheel 3 to the point that teeth of the gear wheel 3 are covered completely. In the shown illustration, en edge of the housing 2 defining the shoulder 20 facing away from the observer is illustrated as a dashed line, because the shoulder 20 is covered by the gear wheel 3.

At a lower side and at a side facing away from the gear wheel 3, the housing 2 is closed. The housing 2 has a housing wall, the inner contour 21 of which tightly encloses the second gear 4 on a side facing way from the gear wheel 3 approximately on half of the periphery of the second gear 4 and forms a small cavity 24 below the meshing region 32, in which the gear wheel 3 is engaged with the second gear 4. An outlet 25 is formed at the cavity 24 through one of the shoulders 20 of the housing 2. Along its lower side, the housing 2 abuts on a region of a housing 7 of the gearbox surrounding the gear wheel 3 in a positive-fit manner. Only a small section of the transmission system housing 7 is illustrated in the shown view.

At an upper flange of the housing 2 facing way from the gear wheel 3, the shoulders 20 have a cylindrical recess 22, which extends parallel to the transmission system axle 5, through which an actuating shaft 6 of the gearbox extends. The actuating shaft 6 is hereby not fixedly connected to the housing 2 so that the housing 2 is held so as to be movable in axial direction along the actuating shaft 6 and can thus accurately follow a movement of the gear wheel 3 in a direction along the gearbox shaft 5.

The housing 2 and the second gear 4 enclosed by the housing 2 are fixed in their position due to the definition by means of the housing 7 of the gearbox, of the actuating shaft 6 running through the recess 22 and the gear wheel 3.

Figure 2:
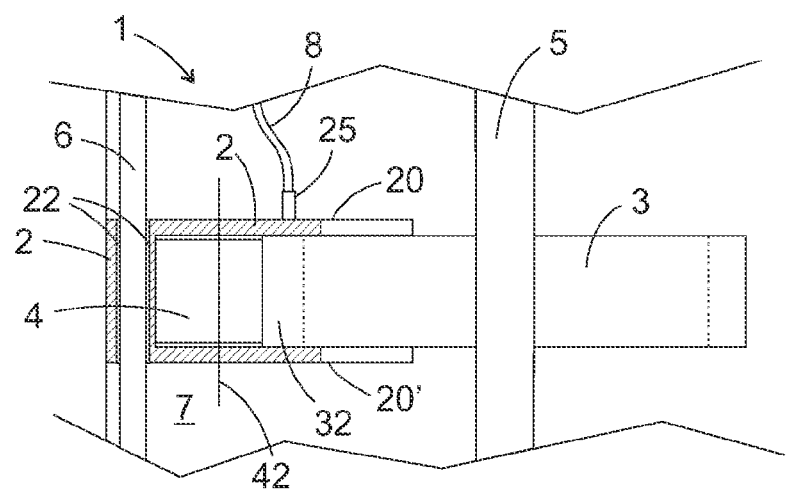
FIG. 2 shows a schematic sectional view along a line A-A from FIG. 1.

FIG. 2 now shows a section along line A-A from FIG. 1, viewed from the top. The gear pump 1 is held on the actuating shaft 6 so as to be axially displaceable with its housing 2. The two shoulders 20, 20' of the housing 2 enclose the second gear 4 from both sides with minimal play, which is required for a free rotation of the gear 4. The gear 4 is suspended in the housing 2 so as not to be rotatable via a shaft, but is freely afloat in the interior thereof, wherein it is enclosed by the housing 2 in radial direction so tightly that the engagement between the teeth of the gears 3, 4 in the meshing region 32 cannot be lost. The second gear 4 meshes with the gear wheel 3 in the region 32. The outlet 25 connects the cavity 24 formed below the meshing region 32 (not visible here) to an oil line 8.

The shoulders 20, 20' of the housing 2 tightly abut on both sides of the gear wheel 3. According to the course of the sectional view shown in FIG. 1, the shoulders 20, 20' are partially illustrated in a sectional view and partially in a top view. If the gear wheel 3 arranged on the shaft 5 is subject to a movement in axial direction in line with the arrangement on the shaft 5 so as to maintain play, the tightly abutting shoulders 20, 20' move with the gear wheel 3 in the direction of movement, and the housing 2 is then displaced in its entirety as compared to the actuating shaft 6.

When the motor vehicle and thus also the gearbox stands still, lubricant accumulates to form a sump (not illustrated) in a region of the transmission system housing 7, in which the lowest region of the gear wheel 3 is arranged. At least a lower part of the gear wheel 3, possibly also a part of the housing 2 dips into the sump. When the gearbox starts to operate, the rotation of the gearbox shaft 5 drives the gear wheel 3. Lubricant from the sump is transported along in the gaps of the teeth of the gear wheel 3 and is conveyed into the housing 2 in the direction of the second gear 4. Due to the meshing of the gear wheel 3 with the second gear 4, the lubricant, however, is held back in front of the meshing region 32 and accumulates in the cavity 24. Other gear wheels of the shaft 5, which also dip into the sump, also take oil from the sump and centrifuge it off, whereby oil is additionally distributed in the interior of the transmission system housing 7.

The lubricant centrifuged off upwards by other gear wheels into the interior of the transmission system housing 7 drips back onto the gear pump 1 again from the top and accumulates in a fuel gallery 23, which is formed by the side walls of the housing 2, which is open towards the top and the second gear 4. The gear wheel 3 drives the second gear 4 so that the second gear 4 further transports the lubricant accumulated in the fuel gallery 23 in the space of its teeth along the inner contour 21 of the housing 2 in the direction of the cavity 24, where it is also held back below the meshing region 32. An oil film forms from the oil transported between the teeth of the second gear 4 along the inner contour 21 of the housing 2 so that the second gear 4 is supported in the housing 2 so as to be afloat.

The rotation of the gear wheel 3 and of the second gear 4 within the gear pump 1 thus builds up an overpressure in the cavity 24, which hereby forms a pressure chamber of the gear pump 1. The accumulates lubricant can be drained from the gear pump 1 specifically and under pressure and can be conveyed to the components of the gearbox via an outlet 25 arranged on one side of the cavity 24 and via the oil line 8 connected thereto.

To be able to effectively collect the oil dripping down from the top, the housing 2 can be widened around the fuel gallery 23 by means of a non-illustrated catch funnel, which is open towards the top.

The peripheral region of the gear 3, which dips into the sump and takes along oil there from decreases to the extent as the gear pump empties the sump and distributes the oil in the transmission system. At a high speed, the conveying effectiveness of the pump decreases. Due to the fact that the oil demand of the transmission system does not increase linearly proportional to the speed, this has the advantageous effect that the portion of the power of an engine driving the transmission system, which is used by the gear pump 1, is smaller in response to a high speed and that the degree of efficiency of the transmission system is improved accordingly.

According to a modification of the embodiment, this effect is used particularly effectively in that the common gear 3 is not the absolutely largest at the shaft 5, but the smallest among a plurality of gears, which dip into the sump, when the sump is in a target area, which is specified for the transmission system. When the transmission system is started, the common gear 3 dips into the sump and conveys oil so that all of the parts of the transmission system, which are to be lubricated, are well lubricated shortly after being started. Due to the level of the sump, which thus decreases, the gear 3 no longer dips at once, the gear pump 1 substantially idles in response to a small requirement of drive power (wherein a lubrication of the pump 1 itself is ensured by oil dripping into the fuel gallery 23 from the top) and the further lubrication is ensured solely at least by a gear, which is greater than the common gear 3 and which furthermore dips into the sump.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit scope, applicability, or configuration in any way. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A gear pump for a gearbox of a motor vehicle, said gear pump comprising:
   a first gear arranged on a gearbox shaft to rotate with said gearbox shaft while maintaining axial play along said gearbox shaft;
   a second gear meshing with said first gear in a meshing region; and
   a gear pump housing enclosing said second gear and a part of said first gear, wherein
   said gear pump housing is movable in the axial direction of said gearbox shaft such that said gear pump housing can follow movement of said first gear within the gearbox due to the axial play of said first gear along said gearbox shaft.

2. A gear pump as set forth in claim 1 wherein said gear pump housing defines a cylindrical recess extending parallel to said gearbox shaft.

3. A gear pump as set forth in claim 2 further comprising a shaft disposed through said cylindrical recess to support said gear pump housing while allowing the movement of said gear pump housing in the axial direction of said gearbox shaft.

4. A gear pump as set forth in claim 1 wherein said second gear is supported by said gear pump housing so as to be afloat.

5. A gear pump as set forth in claim 1 wherein said gear pump housing and said second gear are each formed of a plastic material.

6. A gear pump as set forth in claim 1 wherein said gear pump housing defines a cavity below said meshing region.

7. A gear pump as set forth in claim 6 wherein said gear pump housing defines an outlet extending from said cavity.

8. A gear pump as set forth in claim 7 further comprising an oil line connected to said outlet for draining oil accumulating in said cavity and distributing the oil to other components of the gearbox.

9. A gear pump as set forth in claim 1 enclosed by a gearbox housing.

10. A gear pump as set forth in claim 9 wherein said gear pump housing abuts with the gearbox housing.

11. A gear pump as set forth in claim 1 wherein said gear pump housing defines an inner contour wall tightly enclosing said second gear on about half of a periphery of said second gear.

12. A gear pump as set forth in claim 1 wherein said part of said first gear enclosed by said gear pump housing is less than half of a periphery of said first gear.

13. A gear pump as set forth in claim 12 wherein a lowest location of said periphery of said first gear is not enclosed by said gear pump housing.

14. A gear pump as set forth in claim 2 wherein said cylindrical recess is non-linear with an axis of rotation of said second gear.

* * * * *